(12) United States Patent
Horch et al.

(10) Patent No.: US 12,446,215 B2
(45) Date of Patent: Oct. 14, 2025

(54) ONE-TIME PROGRAMMABLE BITCELL WITH A THERMALLY ENHANCED RUPTURE

(71) Applicant: Synopsys, Inc., Sunnyvale, CA (US)

(72) Inventors: Andrew Edward Horch, Seattle, WA (US); Larry Y. Wang, San Jose, CA (US); WenKai Hung, Zhubei (TW)

(73) Assignee: SYNOPSYS, INC., Sunnyvale, CA (US)

(*) Notice: Subject to any disclaimer, the term of this patent is extended or adjusted under 35 U.S.C. 154(b) by 126 days.

(21) Appl. No.: 18/413,739

(22) Filed: Jan. 16, 2024

(65) Prior Publication Data
US 2025/0234529 A1    Jul. 17, 2025

(51) Int. Cl.
G11C 17/16     (2006.01)
G11C 17/18     (2006.01)
H10B 20/25     (2023.01)

(52) U.S. Cl.
CPC ............. H10B 20/25 (2023.02); G11C 17/16 (2013.01); G11C 17/18 (2013.01)

(58) Field of Classification Search
CPC ........................................ G11C 17/16
USPC .................................................. 365/96
See application file for complete search history.

(56) References Cited

U.S. PATENT DOCUMENTS

| 2012/0249221 A1* | 10/2012 | Oh .................. G11C 17/16 327/525 |
| 2016/0141049 A1* | 5/2016 | Song ................ G11C 17/16 365/51 |
| 2017/0053926 A1 | 2/2017 | Wong et al. |
| 2020/0019379 A1* | 1/2020 | Hsu .................. H04L 9/3278 |
| 2021/0066319 A1 | 3/2021 | Chang et al. |
| 2023/0187003 A1* | 6/2023 | Horch ............... G11C 17/18 365/96 |

FOREIGN PATENT DOCUMENTS

DE     102005023460 A1    11/2006

* cited by examiner

Primary Examiner — Muna A Techane
(74) Attorney, Agent, or Firm — Laxman Sahasrabuddhe; Park, Vaughan, Fleming & Dowler LLP

(57) ABSTRACT

A current may be passed through a channel of an anti-fuse field-effect transistor (FET) to increase a temperature of a gate dielectric of the anti-fuse FET and change a rupture voltage of the gate dielectric of the anti-fuse FET from a first rupture voltage to a second rupture voltage. The gate dielectric may be ruptured by applying a first voltage between the gate dielectric and the channel of the anti-fuse FET, where the first voltage is between the first rupture voltage and the second rupture voltage.

20 Claims, 13 Drawing Sheets

| Signal of Bitcell | Read Bitcell | Program Bitcell | Inhibit Programming of Bitcell |
|---|---|---|---|
| BLR | Pre-charge VDD | 0V | VDD |
| BLP | 0V | VDD | 0V |
| WLR Selected Row | VDD | VDD | VDD |
| WLR Unselected Row | 0V | 0V | 0V |
| WLP Selected Row | 0V | Vrupt | Vrupt |
| WLP Unselected Row | 0V | 0V | 0V |

| Signal of Bitcell | Read Bitcell | Program Bitcell | Inhibit Programming of Bitcell |
|---|---|---|---|
| BLR | Pre-charge 0V | 0V | VDD |
| BLP | 0V | VDD | 0V |
| WLR Selected Row | VDD | VDD | VDD |
| WLR Unselected Row | 0V | 0V | 0V |
| WLP Selected Row | VDD | Vrupt | Vrupt |
| WLP Unselected Row | 0V | 0V | 0V |

| Signal of Bitcell | Read Bitcell | Program Bitcell | Inhibit Programming of Bitcell |
|---|---|---|---|
| BLR | Pre-charge VDD | 0V | Vrupt/2 |
| BLP1 | 0V | VDD | 0V |
| BLP2 | 0V | VDD | Vrupt/2 |
| WLR Selected Row | VDD | Vrupt/2 | Vrupt/2 |
| WLR Unselected Row | 0V | 0V | 0V |
| WLP Selected Row | 0V | Vrupt | Vrupt |
| WLP Unselected Row | 0V | 0V | 0V |

| Signal of Bitcell | Read Bitcell | Program Bitcell | Inhibit Programming of Bitcell |
|---|---|---|---|
| BLR | Pre-charge VDD | X | X |
| BLP | 0V | VDD | 0V |
| WLR Selected Row | VDD | 0V | 0V |
| WLR Unselected Row | 0V | 0V | 0V |
| WLP Selected Row | 0V | Vrupt | Vrupt |
| WLP Unselected Row | 0V | 0V | 0V |

| Signal of Bitcell | Read Bitcell | Program Bitcell | Inhibit Programming of Bitcell |
|---|---|---|---|
| BLR | Pre-charge VDD | X | X |
| BLP | VDD | 0V | Vrupt |
| WLR Selected Row | VDD | 0V | 0V |
| WLR Unselected Row | 0V | 0V | 0V |
| WLP Selected Row | 0V | Vrupt | Vrupt |
| WLP Unselected Row | 0V | 0V | 0V |

ONE-TIME PROGRAMMABLE BITCELL WITH A THERMALLY ENHANCED RUPTURE

TECHNICAL FIELD

The present disclosure relates to electronic circuits. More specifically, the present disclosure relates to a one-time programmable bitcell with a thermally enhanced rupture.

BACKGROUND

An OTP (One Time Programmable) bitcell may be a type of non-volatile memory (NVM) which stores a single bit of information, and which can be programmed so that the bitcell retains its state after the power supply is removed.

SUMMARY

A current may be passed through a channel of an anti-fuse field-effect transistor (FET) to increase a temperature of a gate dielectric of the anti-fuse FET and change a rupture voltage of the gate dielectric of the anti-fuse FET from a first rupture voltage to a second rupture voltage. The gate dielectric may be ruptured by applying a first voltage between the gate dielectric and the channel of the anti-fuse FET, where the first voltage is between the first rupture voltage and the second rupture voltage. A set of anti-fuse FETs which are desired to be ruptured may be selectively heated by passing currents through channels of the set of anti-fuse FETs.

In some embodiments described herein, applying the first voltage between the gate dielectric and the channel of the anti-fuse FET may be performed concurrently with passing the current through the channel of the anti-fuse FET.

In some embodiments described herein, applying the first voltage between the gate dielectric and the channel of the anti-fuse FET may be performed after passing the current through the channel of an anti-fuse FET.

In some embodiments described herein, the anti-fuse FET may be a p-channel metal-oxide semiconductor (PMOS) FET. In some embodiments described herein, the anti-fuse FET may be an n-channel metal-oxide semiconductor (NMOS) FET.

In some embodiments described herein, the anti-fuse FET may be a fin FET. In some embodiments described herein, the anti-fuse FET may be a gate-all-around (GAA) FET.

In some embodiments described herein, the anti-fuse FET may be part of a bitcell. The bitcell may include a circuit to (1) pass a current through a channel of the anti-fuse FET to increase a temperature of a gate dielectric of the anti-fuse FET and change a rupture voltage of the gate dielectric of the anti-fuse FET from a first rupture voltage to a second rupture voltage, and (2) rupture the gate dielectric by applying a first voltage between the gate dielectric and the channel of the anti-fuse FET, where the first voltage is between the first rupture voltage and the second rupture voltage.

In some embodiments described herein, the circuit may include a first FET and a second FET. A source of the first FET may be electrically connected to the drain of the anti-fuse FET, and a source of the anti-fuse FET may be electrically connected to the drain of the second FET.

In some embodiments described herein, the anti-fuse FET may be a PMOS FET, and the circuit may include a first NMOS FET and a second NMOS FET. A gate of the anti-fuse FET may be electrically connected to a drain of the first NMOS FET, and a source of the anti-fuse FET may be electrically connected to a drain of the second NMOS FET.

In some embodiments described herein, the anti-fuse FET may be a PMOS FET, and the circuit may include a first PMOS FET, a first NMOS FET, and a second NMOS FET. A gate of the anti-fuse FET and a gate of the first PMOS FET may be electrically connected to a drain of the first NMOS FET, a source of the anti-fuse FET may be electrically connected to a drain of the first PMOS FET, and a source of the first PMOS FET may be electrically connected to a drain of the second NMOS FET.

In some embodiments described herein, the anti-fuse FET may be a PMOS FET, and the circuit may include a first NMOS FET, a second NMOS FET, and a third NMOS FET. A gate of the anti-fuse FET may be electrically connected to a drain of the first NMOS FET, a source of the anti-fuse FET may be electrically connected to a drain of the second NMOS FET, and a source of the second NMOS FET may be electrically connected to a drain of the third NMOS FET.

In some embodiments described herein, the anti-fuse FET may be an NMOS FET, and the circuit may include a first NMOS FET. A gate of the anti-fuse FET may be electrically connected to a drain of the anti-fuse FET, and a source of the anti-fuse FET may be electrically connected to a drain of the first NMOS FET.

In some embodiments described herein, the anti-fuse FET may be an NMOS FET, and the circuit may include a first PMOS FET and a second PMOS FET. A drain of the anti-fuse FET may be electrically connected to a source of the first PMOS FET, a gate of the anti-fuse FET may be electrically connected to a source of the second PMOS FET, a drain of the first PMOS FET may be electrically connected to a drain of the second PMOS FET, and a gate of the first PMOS FET may be electrically connected to a gate of the second PMOS FET.

BRIEF DESCRIPTION OF THE FIGURES

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
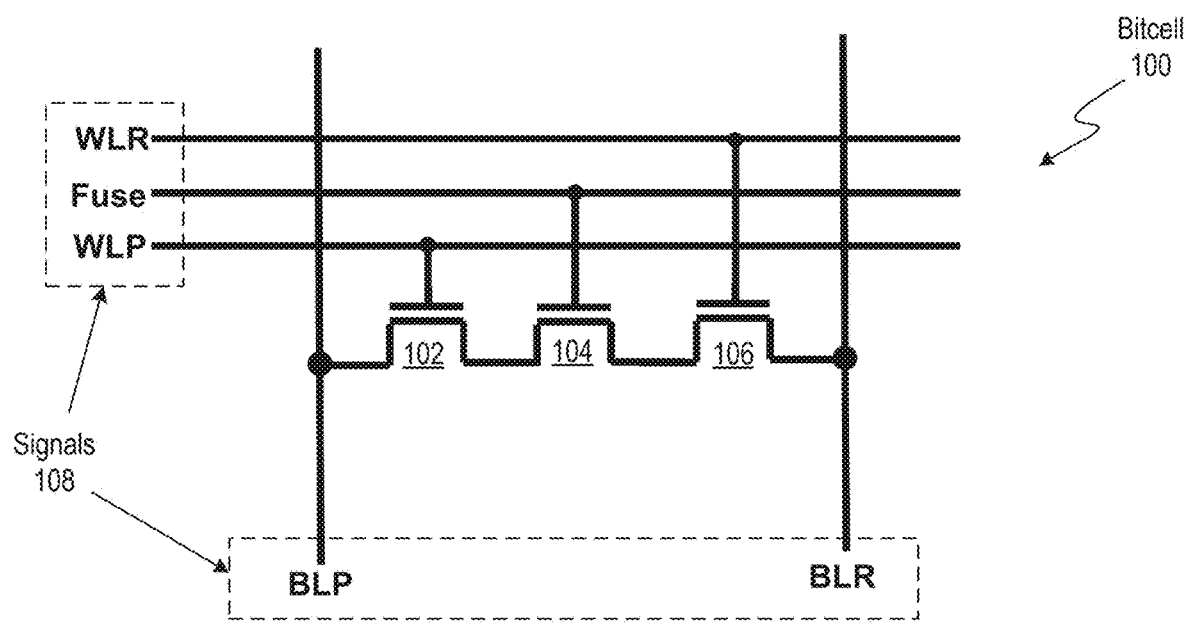
FIGS. 1A-1B illustrate an implementation of a bitcell in accordance with some embodiments described herein.

Aspects of the present disclosure relate to an OTP bitcell with a thermally enhanced rupture. A bitcell may include one or more FETs, and an FET may include a source, a drain, and a gate. The FET may include a channel (which may be constructed using an n-type material or a p-type material) between the source and drain. A dielectric material may separate the gate from the channel. A voltage difference between the gate and the drain may be used to modulate the amount of current that passes through the channel.

An OTP bitcell may include an anti-fuse FET. The anti-fuse FET may have (1) a first state which has a high resistance between the gate and the drain (or source or channel region), and (2) a second state which has a low resistance between the gate and the drain (or source or channel region). The anti-fuse may transition from the first state to the second state when a voltage greater than a rupture voltage is applied across the gate dielectric and the channel/source/drain. Specifically, when a sufficiently high voltage is applied across the dielectric, the dielectric may break or rupture (i.e., the physical property of the dielectric material may change) and cause the gate to be electrically connected to the channel with a low resistance path through the dielectric material. In other words, when the dielectric material ruptures, a filament of conductive material forms during rupture that shorts the gate to the channel or source or drain.

If a semiconductor manufacturing process allows multiple dielectric thicknesses, then a thinner dielectric may be used in an anti-fuse FET, and a thicker dielectric layer may be used in other FETs. A voltage greater than a rupture voltage of the anti-fuse FET may be used to rupture the thinner dielectric in the anti-fuse FET.

Some semiconductor manufacturing processes (which may include, but are not limited to, processes that are used to create nano-wire transistors and/or nano-sheet transistors) may only allow a single gate dielectric thickness. Additionally, the smaller spacing between devices in these processes may make the circuit less tolerant of elevated voltages. In such semiconductor manufacturing processes, it may be difficult to protect other FETs (i.e., the FETs that are not anti-fuse FETs) when rupturing the dielectric in the anti-fuse FETs.

Input/Output (I/O) devices may refer to FETs which can operate at higher voltages and currents than non-I/O FETs also known as core FET's. It is desirable to use I/O devices to generate the high voltages which are used for rupturing the dielectric in an anti-fuse FET. However, some semiconductor manufacturing processes (which may include, but are not limited to, processes that are used to create nano-wire transistors and/or nano-sheet transistors) do not allow I/O devices and non-I/O devices to be manufactured in the same die. In such situations, even more FETs may need to be used in peripheral circuits to split up the high voltage to ensure only the anti-fuse that is to be ruptured is stressed with the full rupture voltage. However, using multiple FETs increases the amount of circuit area used for generating the rupture voltages. In some processes, the rupture voltage may be higher than the source/drain to well diode breakdown voltage. When the diode voltage is lower than the rupture voltage, high leakage from previously programmed bits on a common line may create very high leakage, which may limit the number of bits that can share a common line. This can also force the use of isolated wells to safely handle the high voltage in the periphery. These problems can increase the area used for implementing a memory circuit.

Some embodiments described herein use self-heating properties of an FET to locally heat the dielectric in an anti-fuse FET, which reduces the voltage needed to rupture the dielectric. A thermal runaway may refer to a thermal positive feedback loop which is created when the heat generated by self-heating in the FET is greater than the heat lost (e.g., the heat lost through conduction). The term "self-heating" may refer to the heat which is generated by the FET itself as opposed to heat which is generated by another device that is in proximity to the FET. Thermal runaway may be triggered in an FET by using a combination of high current through the FET, good thermal insulation in the structure of the FET, and optionally pre-heating the FET. Some embodiments described herein cause thermal runaway to occur in an anti-fuse FET, which causes the temperature of the dielectric in the anti-fuse FET to increase, which causes the rupture voltage of the dielectric to decrease. A rupture voltage V2 may be applied across the dielectric to rupture the dielectric, where the rupture voltage V2 is different than the rupture voltage V1 which would have been required to rupture the dielectric if the dielectric had not been heated. Some embodiments described herein use a single-step programming process in which the dielectric in the anti-fuse FET is heated and concurrently the rupture voltage is applied to the heated dielectric. Some embodiments described herein use a two-step programming process in which the dielectric in the anti-fuse FET is heated in a first step, and subsequently a rupture voltage is applied across the dielectric in a second step.

Technical advantages of embodiments described herein include, but are not limited to, (1) allowing implementation of an OTP bitcell in semiconductor manufacturing processes which only allow a single gate dielectric thickness, (2) allowing implementation of an OTP bitcell in semiconductor manufacturing processes which do not include I/O devices, (3) allowing implementation of an OTP bitcell in semiconductor manufacturing processes which have smaller spacing between devices (and thus are less tolerant of elevated voltages), (4) reducing the area of circuits which generate voltages for programming OTP bitcells, and (5) allow simpler peripheral circuits since a low rupture voltage does not need to be split up as much to prevent over stress in any peripheral devices.

Figure 1B:
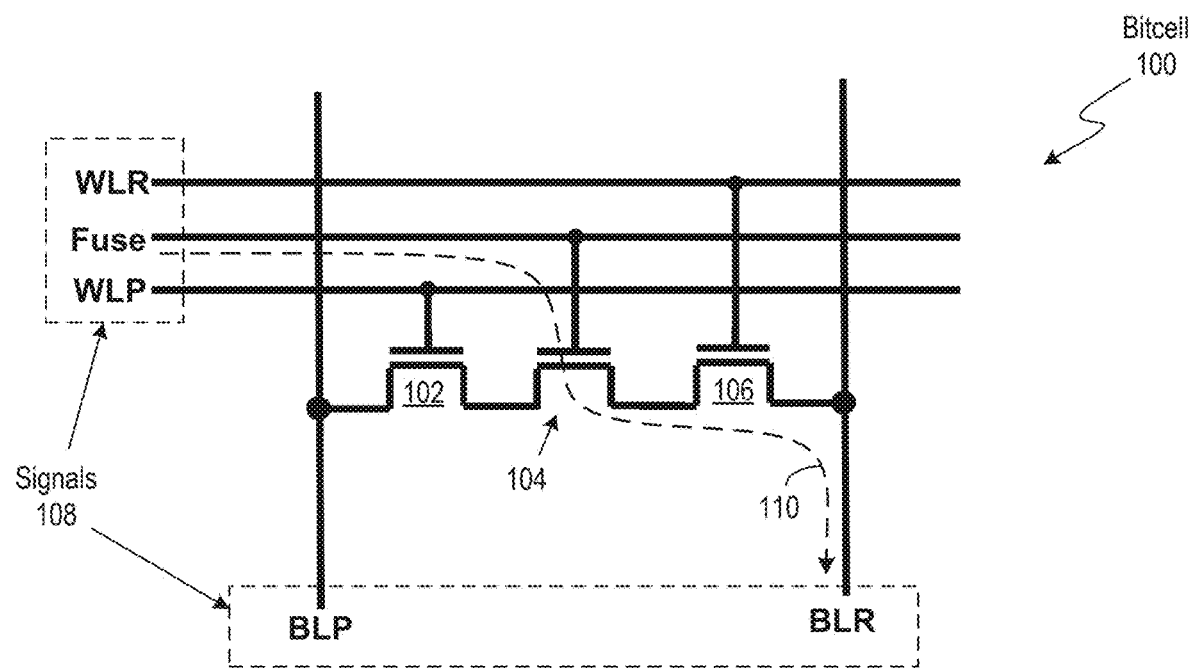

FIGS. 1A-1B illustrate an implementation of a bitcell in accordance with some embodiments described herein.

Bitcell 100 may include FETs 102, 104, and 106. FETs 102 and 106 may operate as pass transistors, and FET 104 may operate as an anti-fuse transistor. Signals 108 may be used to program and read the contents of bitcell 100. Specifically, signals 108 may include a word-line read (WLR) signal, a fuse signal, a word-line program (WLP) signal, a bit-line read (BLR) signal, and a bit-line program (BLP) signal. In this disclosure, a filled circle indicates an electrical connection between two intersecting wires. For example, the wire that carries the WLP signal is electrically connected to the gate of FET 102, the wire that carries the fuse signal is electrically connected to the gate of FET 104, and the wire that carries the WLR signal is electrically connected to the gate of FET 106. Additionally, the wire that carries the BLP signal is electrically connected to the source of FET 102, and the wire that carries the BLR signal is electrically connected to the drain of FET 106. The term "wire" generally refers to a conducting path in a circuit which is used for carrying a signal. Examples of a wire include, but are not limited to, a structure made of doped polysilicon, and a metal trace in a metal layer of an integrated circuit.

The WLR, BLR, and fuse signals may be used for reading the state (i.e., programmed or not programmed) of bitcell 100, and the state of bitcell 100 may correspond to a bit value (e.g., 0 or 1) which is stored in the bitcell. The WLR signal may be used to select a set of bitcells that belong to a word. The fuse signal may be maintained at a desired voltage (e.g., a voltage that corresponds to 0 or 1). If anti-fuse FET 104 has been programmed (i.e., the dielectric of anti-fuse FET 104 has been ruptured), then path 110 has a low resistance, i.e., an electrical connection exists between the fuse wire and the BLR wire. On the other hand, if anti-fuse FET 104 has not been programmed (i.e., the dielectric of anti-fuse FET 104 has not been ruptured), then path 110 has a high resistance, i.e., no electrical connection exists between the fuse wire and the BLR wire. In other words, the voltage of the BLR signal will depend on whether the anti-fuse FET 104 has been programmed or not. The WLP, BLP, and fuse signals may be used for programming bitcell 100. Details of programming bitcell 100 are explained below in reference to FIGS. 2A-2C.

FIGS. 1C-1F illustrate cross-sections of FETs manufactured using different technologies in accordance with some embodiments described herein. In FIGS. 1C-1F, the X-direction is along the left-to-right direction, the Y-direction is along the bottom-to-top direction, and the Z-direction is perpendicular to the drawing page (i.e., the Z-direction comes out of the drawing page).

Figure 1C:
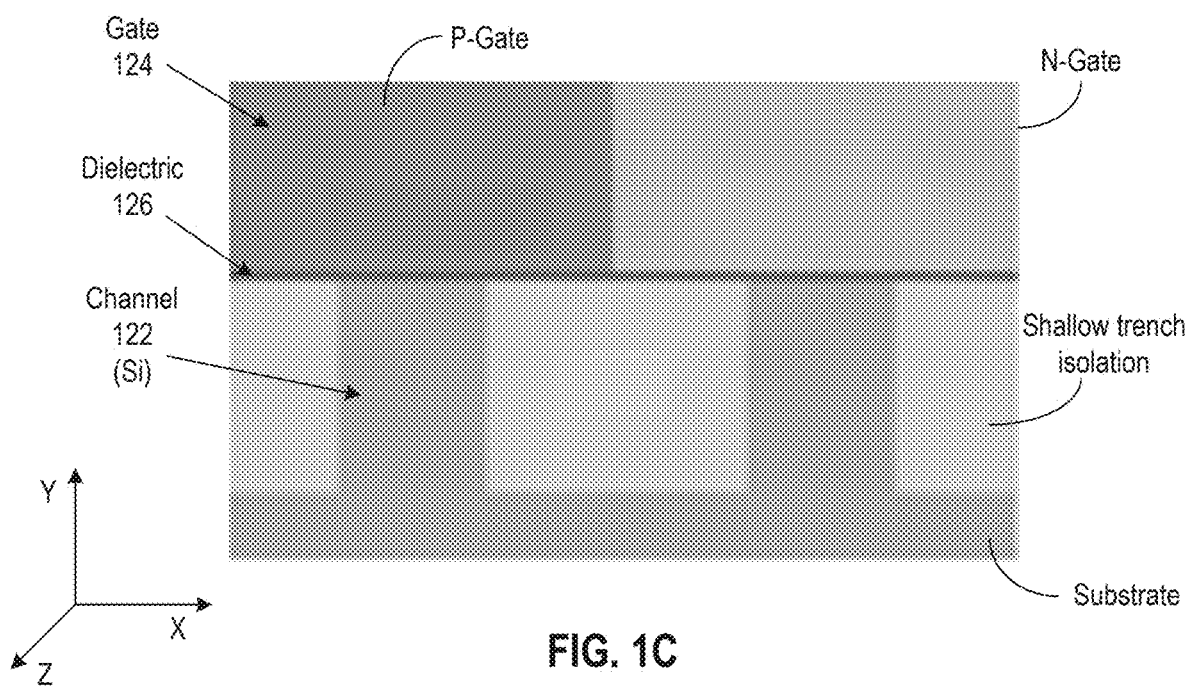
FIGS. 1C-1F illustrate cross-sections of FETs manufactured using different technologies in accordance with some embodiments described herein.

FIG. 1C illustrates a planar FET which includes gate 124, channel 122, and dielectric 126 which insulates gate 124 from channel 122. Channel 122 extends in the Z-direction, and the source and drain terminals of the FET are at the ends of channel 122.

Figure 1D:
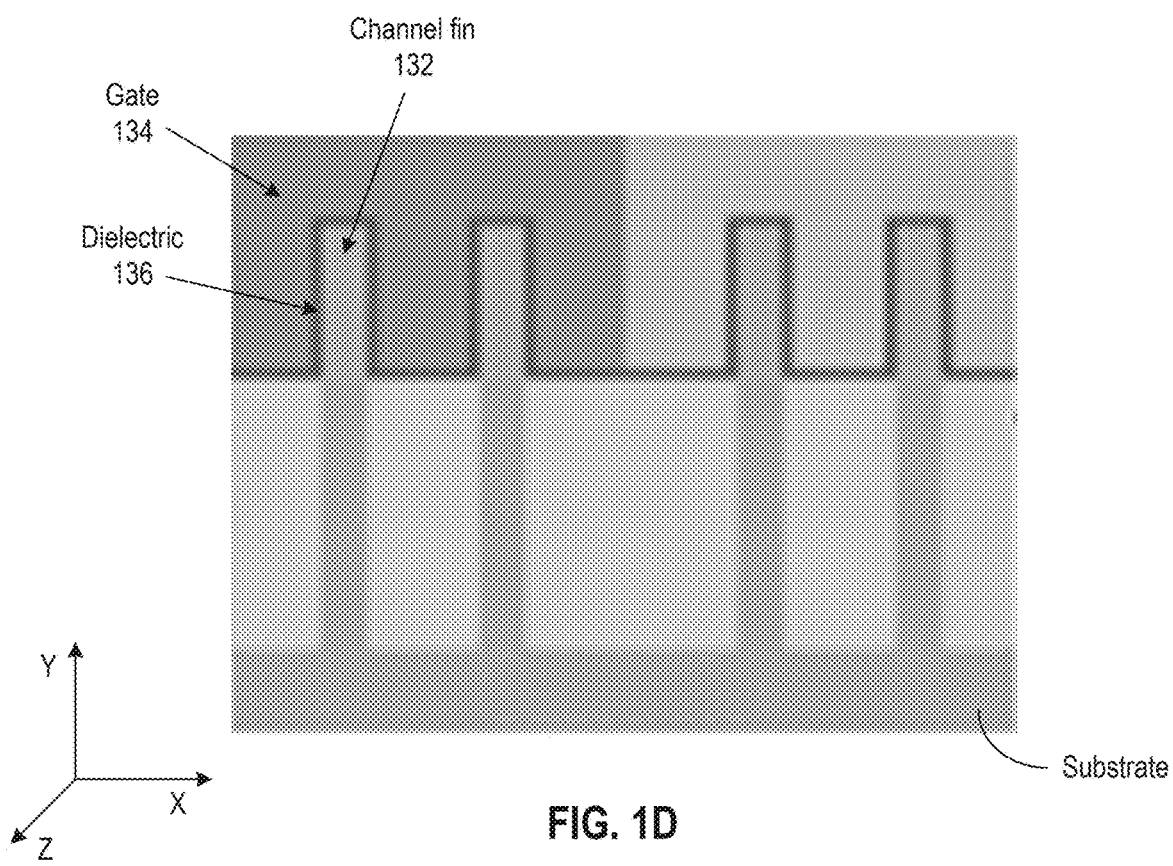

FIG. 1D illustrates a fin FET which includes gate 134, channel fin 132, and dielectric 136 which insulates gate 134 from channel fin 132. Channel fin 132 extends in the Z-direction, and the source and drain terminals of the fin FET are at the ends of channel fin 132.

Figure 1E:
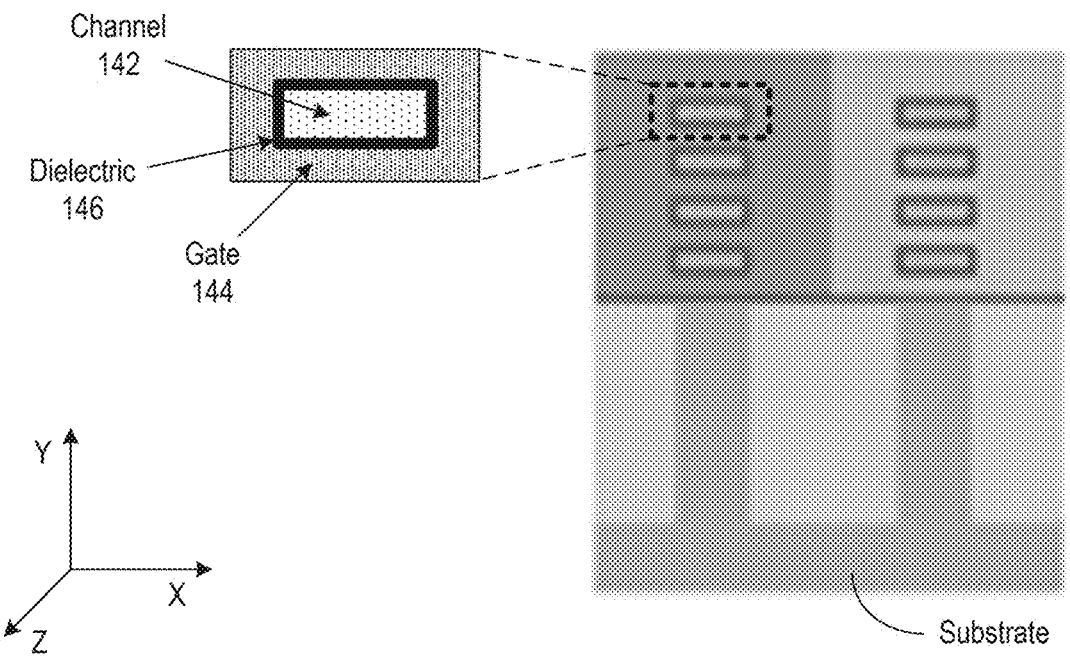

FIG. 1E illustrates a GAA FET which includes gate 144, channel 142, and dielectric 146 which insulates gate 144 from channel fin 142. Channel 142 extends in the Z-direction, and the source and drain terminals of the GAA FET are at the ends of channel 142. As shown in FIG. 1E, the gate 144 structure surrounds the channel 142 structure. Examples of GAA FET structures include, but are not limited to, nanowire-based FETs, nanoribbon-based FETs, and nanosheet-based FETs.

Figure 1F:
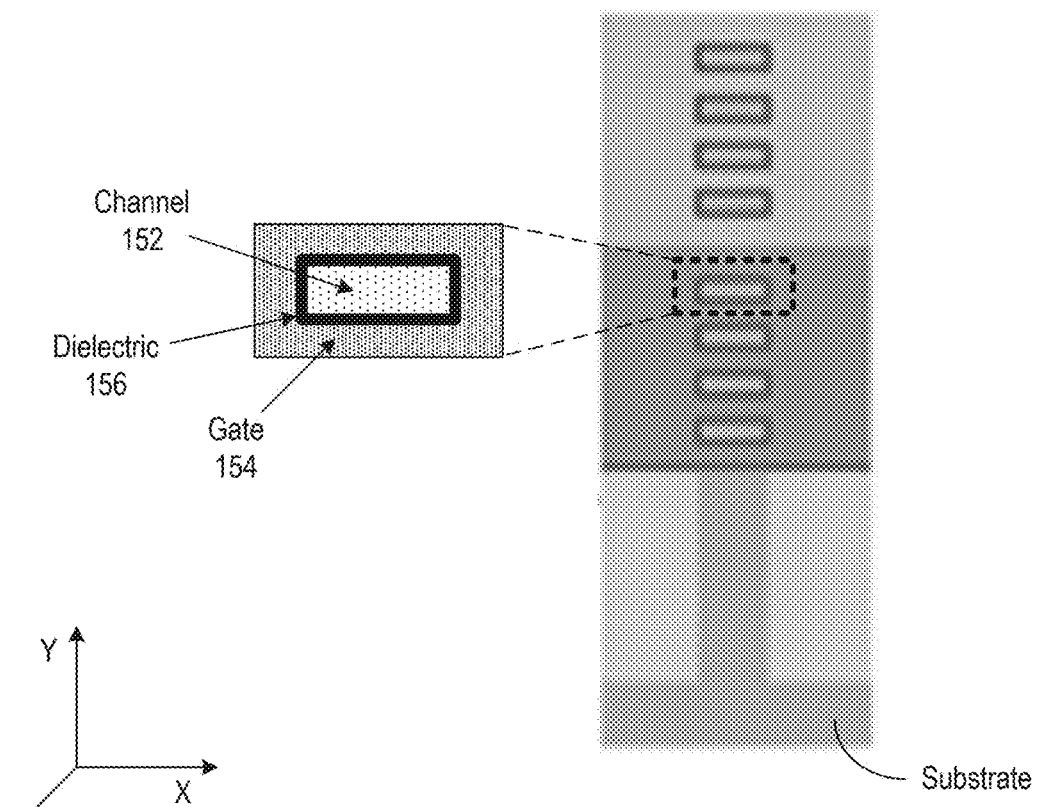

FIG. 1F illustrates a stacked GAA FET which includes gate 154, channel 152, and dielectric 156 which insulates gate 154 from channel 152. Channel 152 extends in the Z-direction, and the source and drain terminals of the stacked GAA FET are at the ends of channel 152. As shown in FIG. 1F, a p-channel GAA FET and an n-channel GAA FET may be stacked on top of each other.

Embodiments described herein may generally be used with FETs manufactured using any technology. The dielectric material may rupture when a voltage greater than a rupture voltage is applied across the gate and the channel of an FET. For example, in FIG. 1E, if a voltage greater than a rupture voltage is applied across gate 144 and channel 142, then dielectric 146 may rupture and create an electrical connection between gate 144 and channel 142.

Most of the heat may be dissipated through the source and drain, i.e., through the channel along the Z-direction in FIGS. 1C-1F. Some heat may also dissipate along the Y-direction in FIG. 1C. However, heat dissipation along the Y-direction is small in the fin FET structure shown in FIG. 1D and the GAA FET structures shown in FIGS. 1E-1F. Self-heating is a serious problem in the fin FET and GAA FET structures shown in FIGS. 1D-1F.

Embodiments described herein use the following insight: the self-heating problem in FETs can be used advantageously to reduce the rupture voltage of an anti-fuse FET. Specifically, some embodiments described herein may selectively cause self-heating to occur in an anti-fuse FET that is desired to be programmed.

FIGS. 2A-2D illustrate a process for selectively programming an anti-fuse FET in accordance with some embodiments described herein.

Figure 2A:
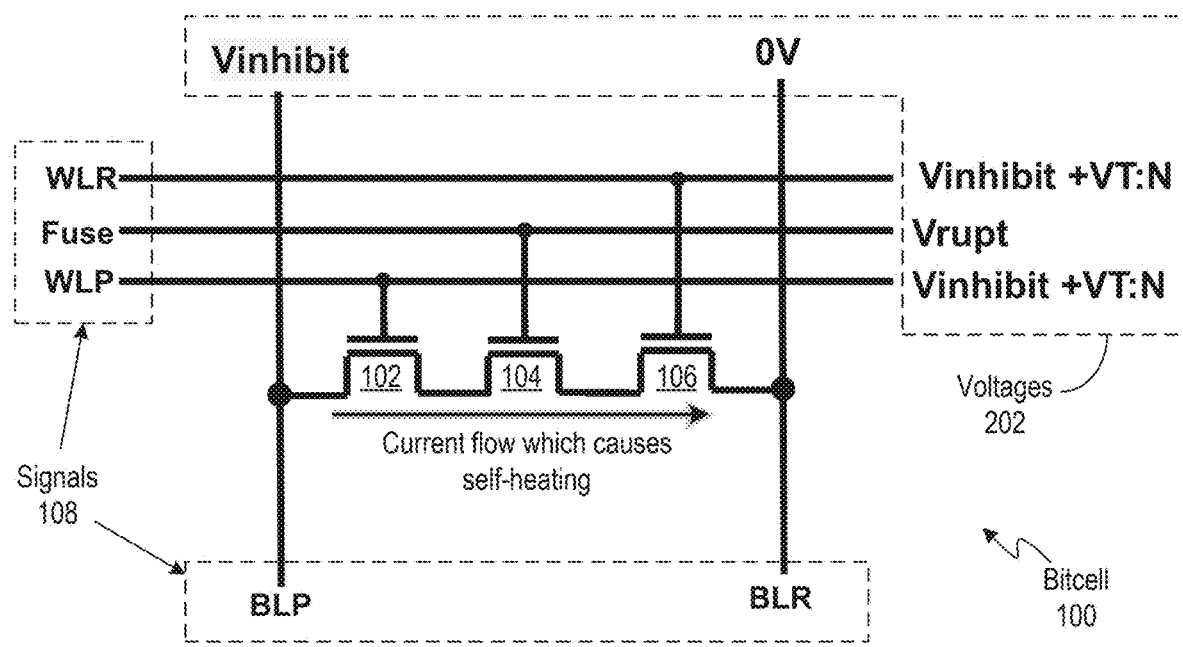
FIGS. 2A-2D illustrate a process for selectively programming an anti-fuse FET in accordance with some embodiments described herein.

In FIG. 2A, voltages 202 may be provided to the signal wires WLR, fuse, WLP, BLP, and BLR, which may cause a current to flow through the channels of FETs 102, 104, and 106, and which may cause self-heating to occur in FETs 102, 104, and 106. Specifically, a voltage of Vinhibit V may be provided to the BLP wire, a voltage of 0 V may be provided to the BLR wire, a voltage of (Vinhibit+VT: N) V may be provided to the WLR wire, a voltage of Vrupt V may be provided to the fuse wire, and a voltage of (Vinhibit+VT: N) V may be provided to the BLP wire. The value "VT: N" may refer to the threshold voltages of FETs 102 and 106 (i.e., the FETs 102 and 106 turn on when the gate-to-drain voltage is greater than or equal to VT: N). These voltage values may cause FETs 102, 104, and 106 to be turned on, and a current to pass through the channel of FETs 102, 104, and 106. The current may cause self-heating to occur in FET 104 and cause the temperature of the dielectric in FET 104 to increase. Vrupt is a voltage differential that can cause the dielectric in FET 104 to rupture when the temperature of the dielectric in FET 104 is sufficiently high (i.e., above a desired temperature). Vinhibit is a voltage that is less than Vrupt, e.g., equal to half of Vrupt. In FIG. 2A, the voltage differential between the gate and the channel of FET 104 is less than Vrupt. Thus, the dielectric of FET 104 may not rupture when voltages 202 are applied as shown in FIG. 2A. Additionally devices 102 and 106 may be optimized for higher current, lower resistance, than device 104. The optimization may be realized by using a wider channel width, more number of fins, or more number of fingers. The optimization can increase the heating in the anti-fuse 104.

Figure 2B:
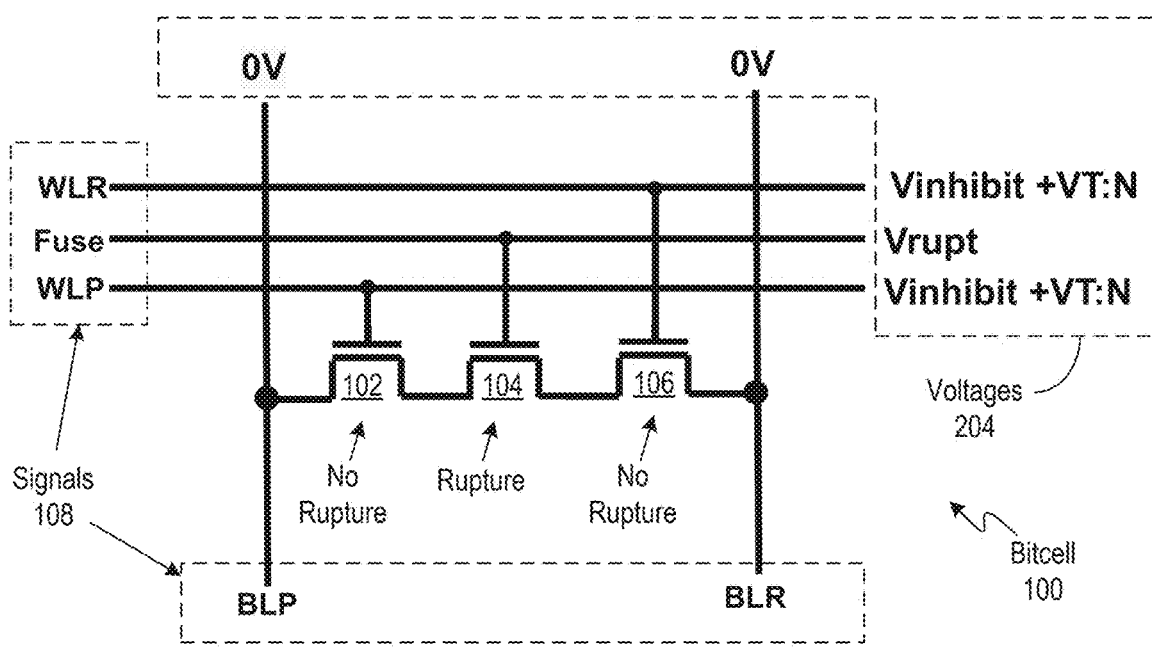

After the dielectric in FET 104 has been heated above the desired temperature, the voltages 204 shown in FIG. 2B may be provided to the signal wires WLR, fuse, WLP, BLP, and BLR. Voltages 204 may rupture the dielectric in FET 104 but may not rupture the dielectrics in FETs 102 and 106. Specifically, a voltage of 0 V may be provided to the BLP wire and the BLR wire, a voltage of (Vinhibit+VT: N) V may be provided to the WLR wire, a voltage of Vrupt V may be provided to the fuse wire, and a voltage of (Vinhibit+VT: N) V may be provided to the BLP wire. These voltage values may cause FETs 102, 104, and 106 to be turned on, but no current may flow through FETs 102, 104, and 106 because both BLP and BLR are at 0 V. In FIG. 2B, the voltage differential between the gate and the channel of FET 104 is equal to Vrupt. Thus, the dielectric of FET 104 may rupture when voltages 204 are applied as shown in FIG. 2B.

Figure 2C:

FIG. 2C illustrates the voltages which may be used for reading the contents of a bitcell, programming a bitcell, and inhibiting the programming of a bitcell. Column 252 specifies the signal wires, column 254 specifies the voltages which may be applied to the signal wires of a selected bitcell to read the contents of the selected bitcell, column 256 specifies the voltages which may be applied to the signal wires of a selected bitcell to program the selected bitcell, and column 258 specifies the voltages which may be applied to the signal wires of an unselected bitcell to inhibit programming of the unselected bitcell.

For example, to read a selected bitcell, column 254 specifies that, for the selected bitcell, the BLR wire is pre-charged to 0 V (the term "pre-charge" may refer to using a pre-charging circuit to gradually change the voltage to a desired voltage as opposed to suddenly setting the voltage to the desired voltage and causing a sudden current spike), the BLP wire is set to 0 V, the WLR wire is set to VDD (the term "VDD" may refer to the positive power supply voltage, e.g., 5 V), the WLP wire is set to 0 V, and the fuse wire is set to VDD. Column 254 also specifies that, for unselected bitcells (i.e., the bitcells whose content is not desired to be read), the BLR wire is pre-charged to 0 V, the BLP wire is set to 0 V, the WLR wire is set to 0 V, the WLP wire is set to 0 V, and the fuse wire is set to 0 V. The other columns in FIG. 2C may be interpreted similarly.

Figure 2D:
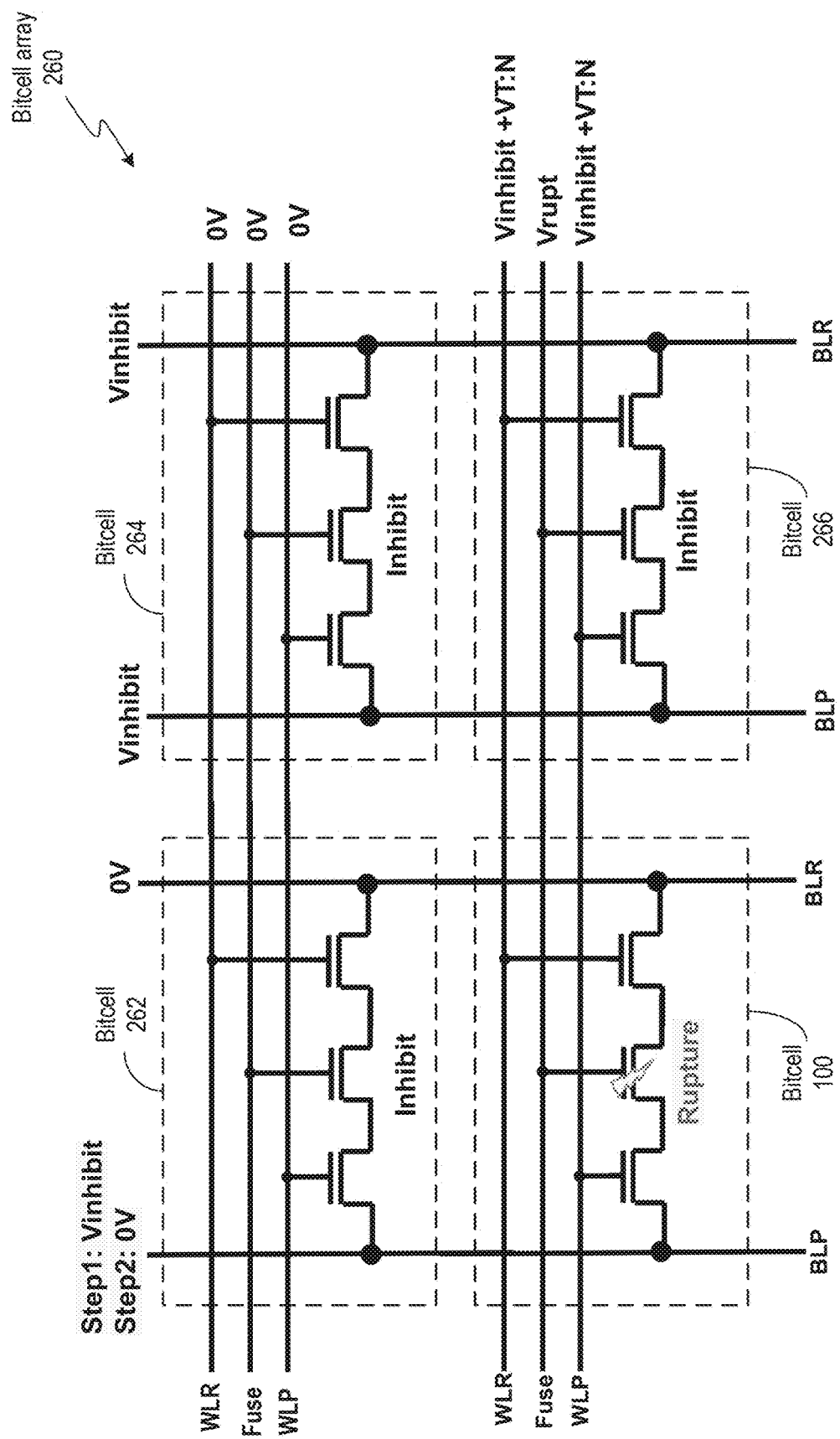

FIG. 2D illustrates selectively programming a bitcell in an array of bitcells using the voltages shown in FIG. 2C. Bitcell array 260 may include bitcells 262, 264, 266, and 100. A voltage of 0 V may be provided to the WLR, fuse, and WLP wires of bitcells 262 and 264. Additionally, a voltage of Vinhibit V may be provided to the BLP and BLR wires of bitcells 264 and 266. These voltages may produce no current flow through the FETs in bitcells 262, 264, and 266. Consequently, no self-heating may occur in the FETs in bitcells 262, 264, and 266. Moreover, these voltages may cause the voltage differential between the gate and the channel of the FETs in bitcells 262, 264, and 266 to be less than Vrupt. Thus, the dielectrics in the FETs of bitcells 262, 264, and 266 may not disrupt. On the other hand, the dielectric of the anti-fuse FET in bitcell 100 may rupture as explained above in reference to FIGS. 2A-2B.

Figure 3:
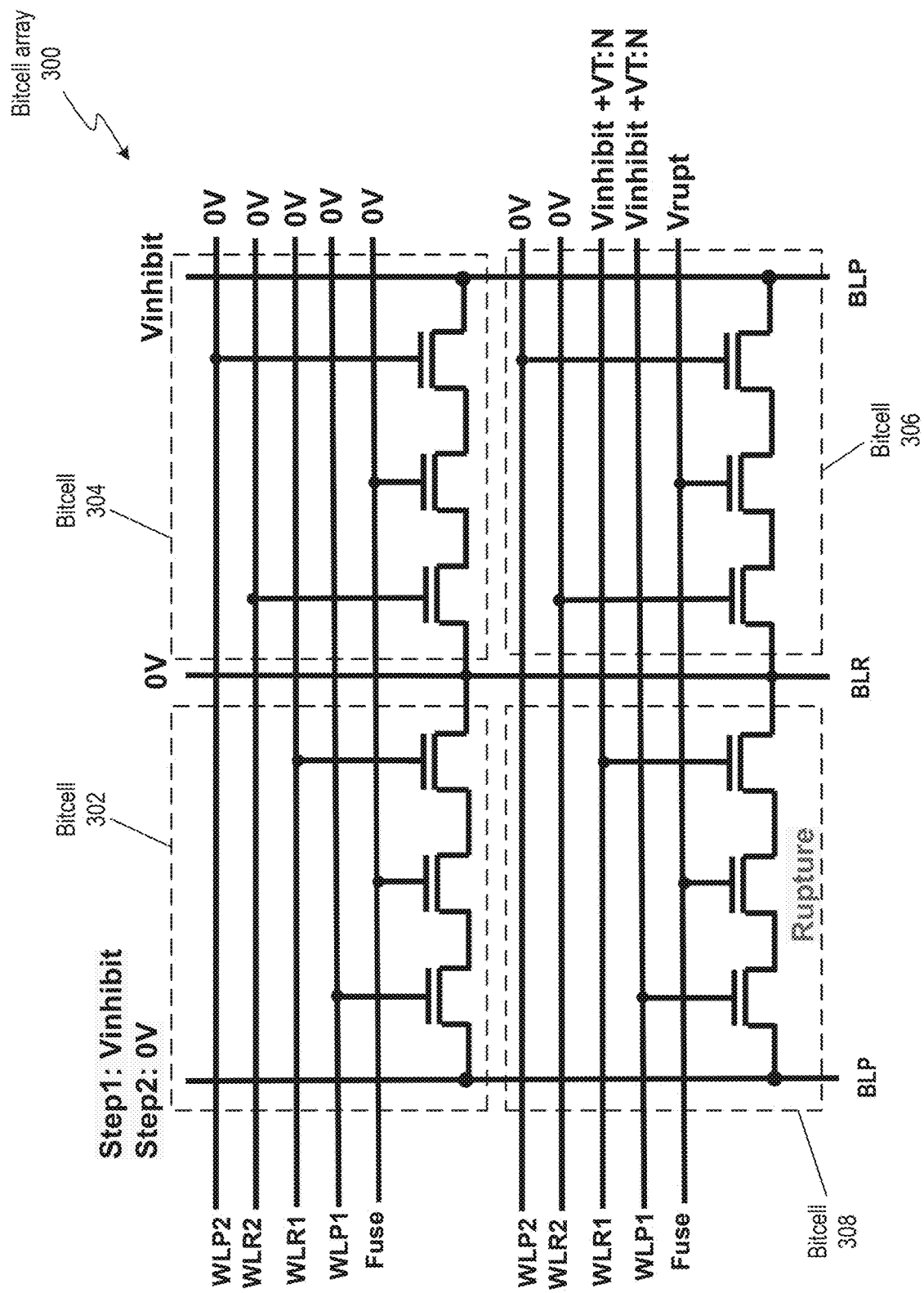
FIG. 3 illustrates an implementation of a bitcell array in accordance with some embodiments described herein.

FIG. 3 illustrates an implementation of a bitcell array in accordance with some embodiments described herein.

Bitcell array 300 may include bitcells 302, 304, 306, and 308. In bitcell array 300, adjacent bitcells in the same row may share a BLR wire. For example, bitcells 302 and 304 share the same BLR wire. Thus, the implementation shown in FIG. 3 may reduce the number of vertical wires when compared with the implementation shown in FIG. 2D. Specifically, the bitcell array 260 shown in FIG. 2D uses four vertical wires (two BLP wires and two BLR wires), whereas the bitcell array 300 shown in FIG. 3 uses three vertical wires (two BLP wires and one BLR wire). However, the implementation shown in FIG. 3 may increase the number of horizontal wires. Specifically, bitcell array 260 shown in FIG. 2D uses a single WLR wire and a single WLP wire per row of bitcells, whereas bitcell array 300 uses two WLP wires (labeled as WLP1 and WLP2 in FIG. 3) and two WLR wires (labeled as WLR1 and WLR2 in FIG. 3) per row of bitcells. The wires WLP1 and WLR1 may be used for bitcell 302, and the wires WLP2 and WLR2 may be used for bitcell 304.

Figures 4A, 4B:
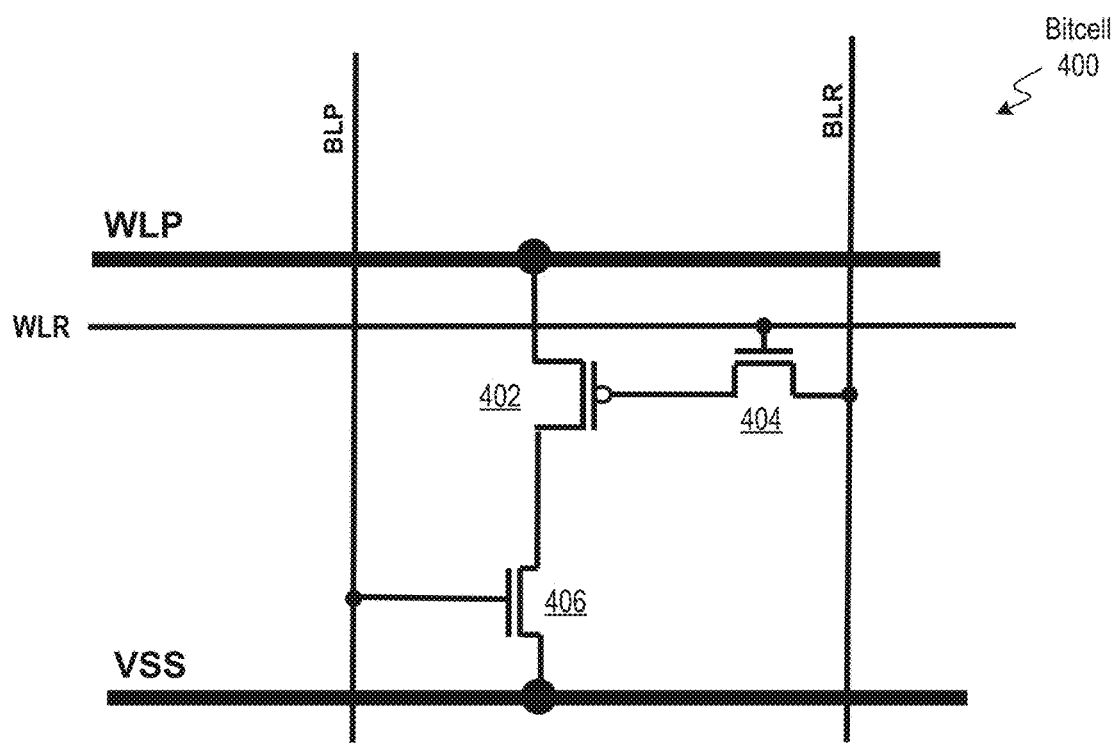
FIGS. 4A-4B illustrate an implementation of a bitcell in accordance with some embodiments described herein.

FIGS. 4A-4B illustrate an implementation of a bitcell in accordance with some embodiments described herein. Some embodiments may heat the anti-fuse and stress the gate dielectric at the same time. This prevents any cooling down that may occur after the heating operation stops and gate stress is applied. In addition, if the rupture voltage after heating is approximately equal to the inhibit voltage for unheated devices, then the heating can be used to select which anti-fuse is ruptured. In this case, the same rupture voltage may be applied to both bitcells that are to be programmed and bitcells that are not (programming inhibited) with the difference being that the cells to be programmed are heated. The heating causes the rupture to occur even at the inhibit voltage (i.e., in some embodiments, the heating may cause rupture to selectively occur in those bitcells which are desired to be programmed). One advantage of this approach is that the peripheral circuitry can be simplified because the peripheral circuitry does not have to switch an additional voltage, e.g., Vinhibit (in addition to Vrupt). The peak electrical stress in the anti-fuse may be between the gate and either the source or drain.

Bitcell 400 may include a PMOS anti-fuse FET 402, and NMOS FETs 404 and 406. The WLP wire may be electrically connected to the drain of the PMOS anti-fuse FET 402, the source of the PMOS anti-fuse FET 402 may be electrically connected to the drain of the NMOS FET 406, and the source of the NMOS FET 406 may be electrically connected to VSS (the term "VSS" may refer to ground (0 V) or a negative power supply voltage, e.g., −5 V). The gate of the PMOS anti-fuse FET 402 may be electrically connected to the drain of the NMOS FET 404, and the source of the NMOS FET 404 may be electrically connected to the BLR wire. The gate of the NMOS FET 406 may be electrically connected to the BLP wire, and the gate of the NMOS FET 404 may be electrically connected to the WLR wire.

FIG. 4B illustrates the voltages which may be used for reading the contents of bitcell 400, programming bitcell 400, and inhibiting the programming of bitcell 400 (e.g., when a bitcell other than bitcell 400 is selected for programming). The columns in FIG. 4B may be interpreted similarly to the columns shown in FIG. 2C. Specifically, column 452 specifies the signal wires, column 454 specifies the voltages which may be applied to the signal wires of a selected bitcell to read the contents of the selected bitcell, column 456 specifies the voltages which may be applied to the signal wires of a selected bitcell to program the selected bitcell, and column 458 specifies the voltages which may be applied to the signal wires of an unselected bitcell to inhibit programming of the unselected bitcell.

Bitcell 400 may be programmed in a single step (as opposed to the two-step process used for programming bitcell 100). Specifically, to program a selected bitcell, the voltages in column 456 may be used. The BLR wire is set to 0 V, the BLP wire is set to VDD, the WLR wire is set to VDD, and the WLP wire is set to Vrupt. NMOS FET 404 is on (i.e., the channel of NMOS FET 404 is conducting and a low voltage drop exists across the channel) because the gate of NMOS FET 404 is at VDD and the source of NMOS FET 404 is at 0 V. Thus, the gate voltage of PMOS anti-fuse FET 402 (which is electrically connected to the drain of NMOS FET 404) is near 0 V. PMOS anti-fuse FET 402 is on because the gate of PMOS anti-fuse FET 402 is near 0 V and the drain of PMOS anti-fuse FET 402 is at Vrupt. NMOS FET 406 is on because the gate of NMOS FET 406 is at VDD and the source is at VSS. Thus, a current flows from the WLP wire to the VSS wire which passes through the channel of the PMOS anti-fuse FET 402 and the channel of NMOS FET 406.

When PMOS anti-fuse FET 402 and the FET 406 are in the on state, the drain-to-source impedance of PMOS anti-fuse FET 402 may be greater than the drain-to-source impedance of NMOS FET 406. Consequently, most of the voltage drop between Vrupt (which is the voltage of the WLP wire) and VSS occurs across the channel of the PMOS anti-fuse FET 402. In some variations of this bitcell device 406 is sized to carry more current. For example, device 406 may be wider, have more fins or more fingers. In other words, the voltage across the gate and the channel of PMOS anti-fuse FET 402 is near or equal to Vrupt. On the other hand, the voltage across the gate and the channel of NMOS FET 406 is less than Vrupt. The current flowing through the channel of PMOS anti-fuse FET 402 may cause self-heating in PMOS anti-fuse FET 402, which may cause the temperature of the dielectric of PMOS anti-fuse FET 402 to increase. As the temperature of the dielectric of PMOS anti-fuse FET 402 increases, the rupture voltage of the dielectric changes. When the temperature is sufficiently high, the voltage across the gate and the channel of PMOS anti-fuse FET 402 causes the dielectric of PMOS anti-fuse FET 402 to rupture.

Figures 5A, 5B:
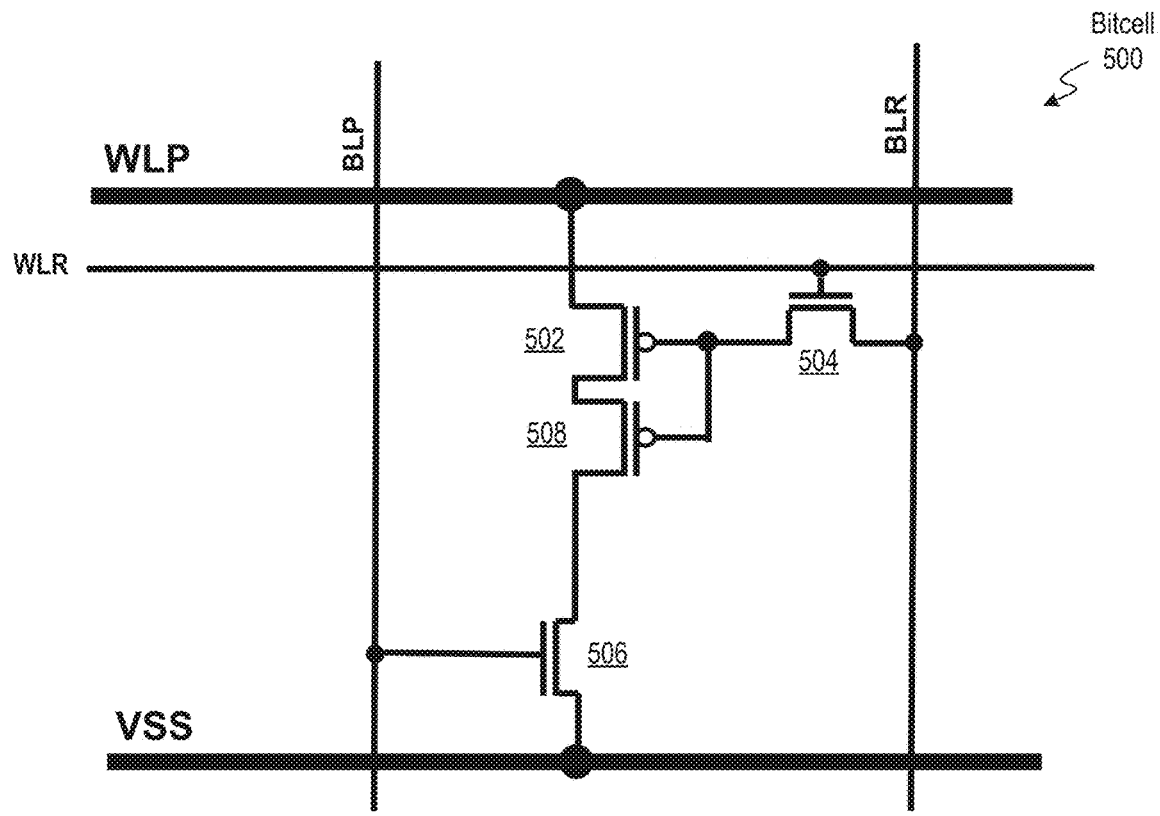
FIGS. 5A-5B illustrate an implementation of a bitcell in accordance with some embodiments described herein.

FIGS. 5A-5B illustrate an implementation of a bitcell in accordance with some embodiments described herein. The devices in this bitcell can be optimized to maximize heat. Heat is primarily conducted away through the source and drain up through the metal stack. When two devices are coupled in series, the heat that would be conducted away from one device now flows into the other device which is in series. Heat can be maximized by putting devices in series or parallel or both. Other layout changes that increase the heat of the anti-fuse can also be used.

Bitcell 500 may include PMOS anti-fuse FETs 502 and 508, and NMOS FETs 404 and 406. PMOS anti-fuse FETs 502 and 508 may be coupled in series, i.e., the source of PMOS anti-fuse FETs 502 may be electrically connected to the drain of PMOS anti-fuse FETs 508. The WLP wire may be electrically connected to the drain of the PMOS anti-fuse FET 502, the source of the PMOS anti-fuse FET 502 may be electrically connected to the drain of the NMOS FET 506, and the source of the NMOS FET 506 may be electrically connected to VSS. The gates of PMOS anti-fuse FETs 502 and 508 may be electrically connected to the drain of NMOS FET 504, and the source of NMOS FET 504 may be electrically connected to the BLR wire. The gate of the NMOS FET 506 may be electrically connected to the BLP wire, and the gate of the NMOS FET 504 may be electrically connected to the WLR wire.

FIG. 5B illustrates the voltages which may be used for reading the contents of bitcell 500, programming bitcell 500, and inhibiting the programming of bitcell 500 (e.g., when a bitcell other than bitcell 500 is selected for programming). The columns in FIG. 5B may be interpreted similarly to the columns shown in FIG. 2C. Specifically, column 552 specifies the signal wires, column 554 specifies the voltages which may be applied to the signal wires of a selected bitcell to read the contents of the selected bitcell, column 556 specifies the voltages which may be applied to the signal wires of a selected bitcell to program the selected bitcell, and column 558 specifies the voltages which may be applied to the signal wires of an unselected bitcell to inhibit programming of the unselected bitcell.

Bitcell 500 may be operated in a similar way to bitcell 400. Bitcell 500 includes two PMOS anti-fuse FETs 502 and 508 which are coupled in series (as opposed to a single PMOS anti-fuse FETs 402 in bitcell 400). Using two PMOS anti-fuse FETs 502 and 508 in series may allow a lower current to be used to self-heat and rupture at least one of PMOS anti-fuse FETs 502 and 508. Programming of bitcell 500 may be achieved by rupturing the dielectric of only PMOS anti-fuse FET 502, or only PMOS anti-fuse FET 508, or both PMOS anti-fuse FETs 502 and 508.

Figures 6A, 6B:
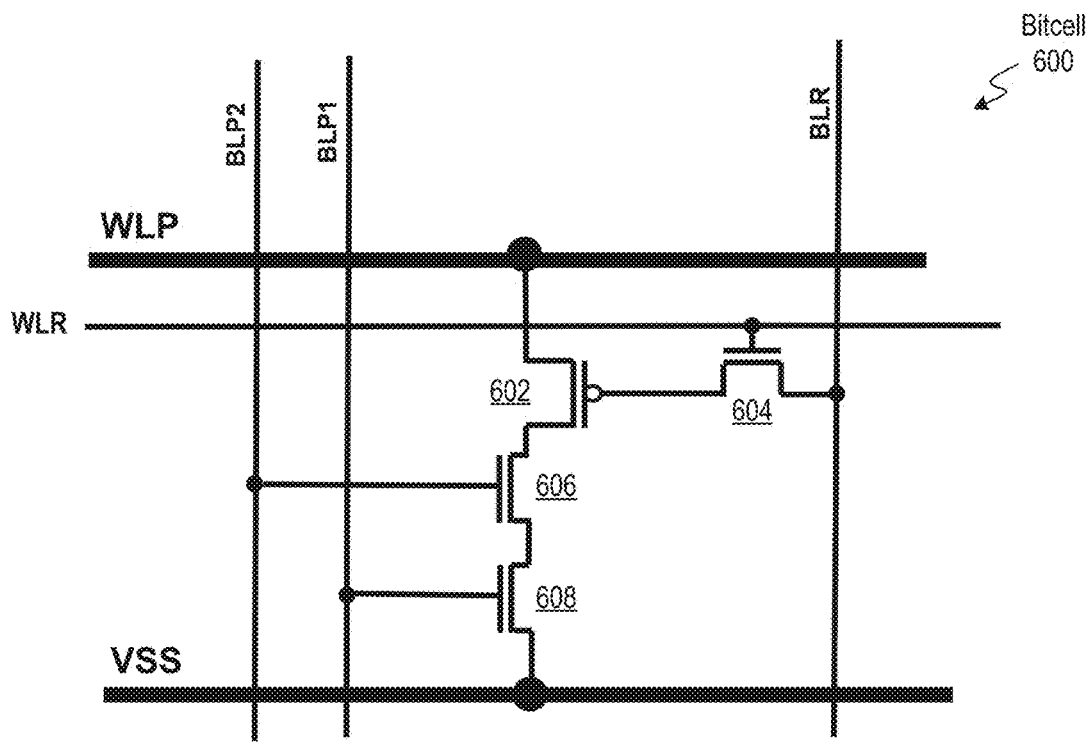
FIGS. 6A-6B illustrate an implementation of a bitcell in accordance with some embodiments described herein.

FIGS. 6A-6B illustrate an implementation of a bitcell in accordance with some embodiments described herein. In some cases, stress on devices other than the anti-fuse in the bitcell can be a problem. If the rupture voltage is high enough, a previously programmed bitcell that shared a WLP line with a bitcell being programmed might damage one of the other devices. To reduce the voltage on the gate of any of the selected devices, the device can be replaced with a pair of devices which may break up the voltage over two devices, which may prevent over stressing the devices.

Bitcell 600 may include PMOS anti-fuse FET 602, and NMOS FETs 604, 606, and 608. NMOS FETs 606 and 608 may be coupled in series, i.e., the source of NMOS FET 606 may be electrically connected to the drain of NMOS FET 608. The WLP wire may be electrically connected to the drain of PMOS anti-fuse FET 602, the source of PMOS anti-fuse FET 602 may be electrically connected to the drain of NMOS FET 606, and the source of NMOS FET 608 may be electrically connected to VSS. The gate of PMOS anti-fuse FET 602 may be electrically connected to the drain of NMOS FET 604, and the source of NMOS FET 604 may be electrically connected to the BLR wire. The gate of NMOS FET 606 may be electrically connected to the BLP2 wire, the gate of the NMOS FET 608 may be electrically connected to the BLP1 wire, and the gate of the NMOS FET 604 may be electrically connected to the WLR wire.

FIG. 6B illustrates the voltages which may be used for reading the contents of bitcell 600, programming bitcell 600, and inhibiting the programming of bitcell 600 (e.g., when a bitcell other than bitcell 600 is selected for programming). The columns in FIG. 6B may be interpreted similarly to the columns shown in FIG. 2C. Specifically, column 652 specifies the signal wires, column 654 specifies the voltages which may be applied to the signal wires of a selected bitcell to read the contents of the selected bitcell, column 656 specifies the voltages which may be applied to the signal wires of a selected bitcell to program the selected bitcell, and column 658 specifies the voltages which may be applied to the signal wires of an unselected bitcell to inhibit programming of the unselected bitcell.

Bitcell 600 may be operated in a similar way to bitcell 400. Bitcell 600 includes two NMOS FETs 606 and 608 instead of a single NMOS FET 406 in bitcell 400. Using two NMOS FETs 606 and 608 in series may reduce the gate-to-channel voltage in the two NMOS FETs 606 and 608, which may prevent the dielectric in the two NMOS FETs 606 and 608 from rupturing when bitcell 600 is programmed. Bitcell 600 may be programmed similarly to bitcell 400, e.g., by heating the dielectric of PMOS anti-fuse FET 602 by passing a current through the channel of PMOS anti-fuse FET 602, and concurrently applying a gate-to-channel voltage to PMOS anti-fuse FET 602 which is greater than the rupture voltage.

Figures 7A, 7B:
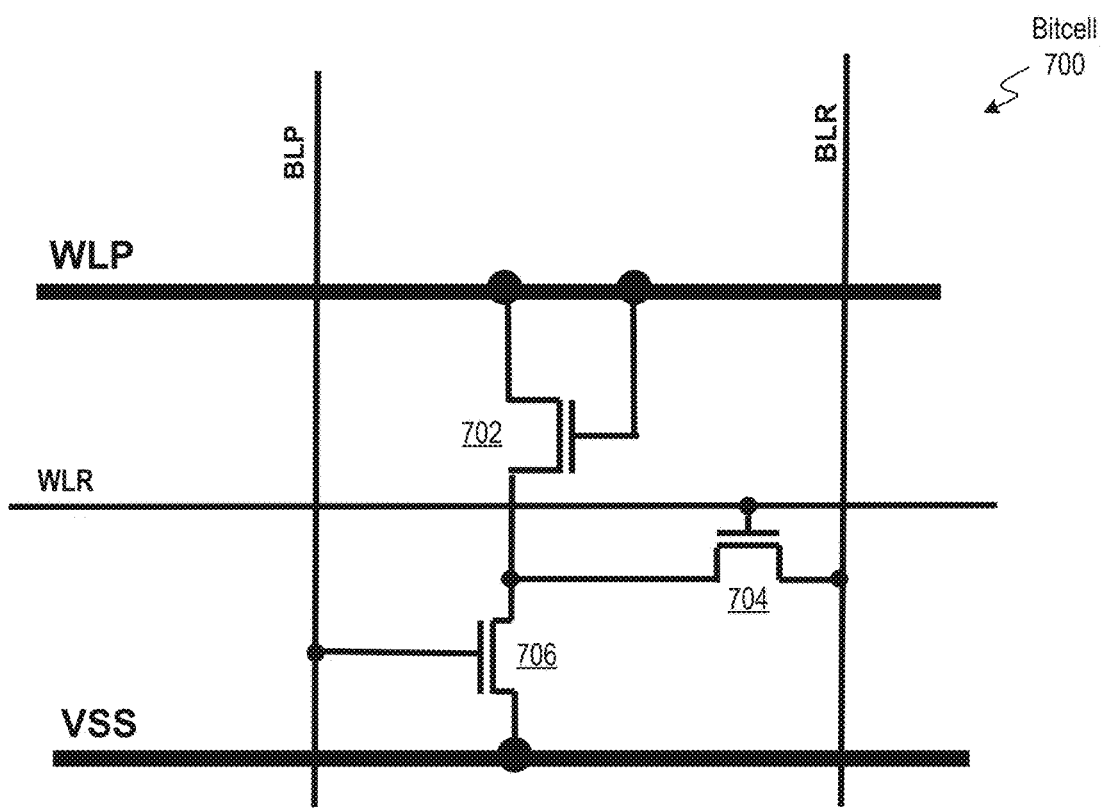
FIGS. 7A-7B illustrate an implementation of a bitcell in accordance with some embodiments described herein.

FIGS. 7A-7B illustrate an implementation of a bitcell in accordance with some embodiments described herein.

Bitcell 700 may include NMOS anti-fuse FET 702, and NMOS FETs 704 and 706. The WLP wire may be electrically connected to the drain and the gate of the NMOS anti-fuse FET 702, the source of the NMOS anti-fuse FET 702 may be electrically connected to the drain of the NMOS FET 706, and the source of the NMOS FET 706 may be electrically connected to VSS. The drain of NMOS FET 706 may also be electrically connected to the drain of NMOS FET 704, and the source of NMOS FET 704 may be electrically connected to the BLR wire. The gate of the NMOS FET 706 may be electrically connected to the BLP wire, and the gate of the NMOS FET 704 may be electrically connected to the WLR wire.

FIG. 7B illustrates the voltages which may be used for reading the contents of bitcell 700, programming bitcell 700, and inhibiting the programming of bitcell 700 (e.g., when a bitcell other than bitcell 700 is selected for programming). The columns in FIG. 7B may be interpreted similarly to the columns shown in FIG. 2C. Specifically, column 752 specifies the signal wires, column 754 specifies the voltages which may be applied to the signal wires of a selected bitcell to read the contents of the selected bitcell, column 756 specifies the voltages which may be applied to the signal wires of a selected bitcell to program the selected bitcell, and column 758 specifies the voltages which may be applied to the signal wires of an unselected bitcell to inhibit programming of the unselected bitcell. In FIG. 7B, the voltage "X" refers to a "don't care" voltage, i.e., the voltage may be equal to 0 V or VDD or anything in between.

Bitcell 700 may be operated in a similar way to bitcell 400. For example, the voltages in column 756 may be used to program bitcell 700 by (1) heating the dielectric of NMOS anti-fuse FET 702 by passing a large current through the channel of NMOS anti-fuse FET 702, and (2) concurrently applying a gate-to-source voltage to NMOS anti-fuse FET 702, where the gate-to-source voltage is greater than or equal to a rupture voltage.

Figures 8A, 8B:
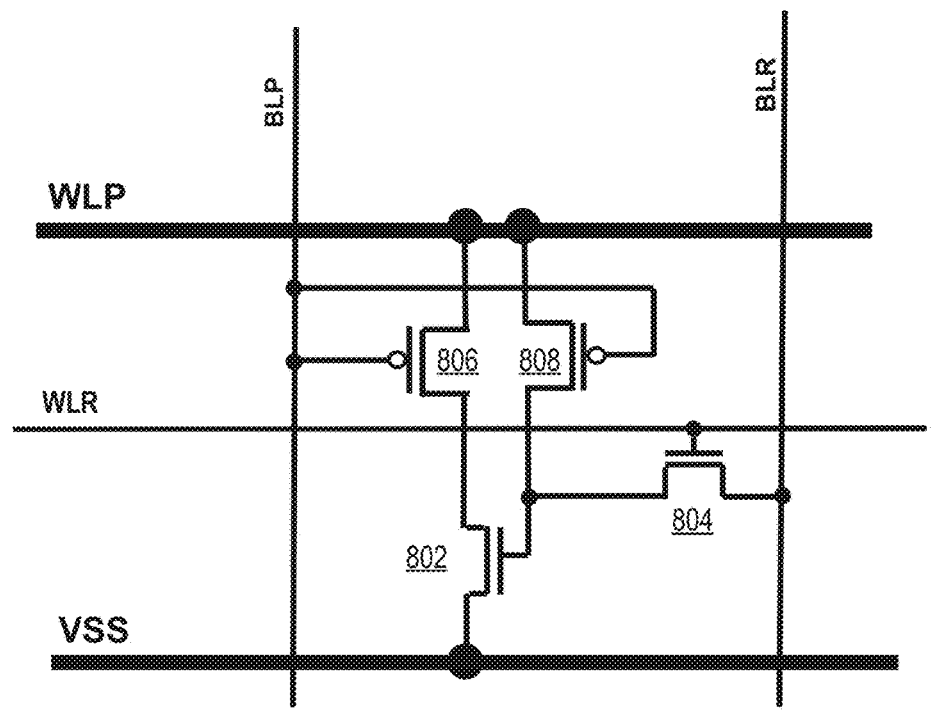
FIGS. 8A-8B illustrate an implementation of a bitcell in accordance with some embodiments described herein.

FIGS. 8A-8B illustrate an implementation of a bitcell in accordance with some embodiments described herein.

Bitcell 800 may include NMOS anti-fuse FET 802, NMOS FET 804, and PMOS FETs 806 and 808. The WLP wire may be electrically connected to the drains of PMOS FETs 806 and 808. The gates of PMOS FETs 806 and 808 may be electrically connected to the BLP wire. The source of PMOS FET 806 may be electrically connected to the drain of NMOS anti-fuse FET 802, and the source of PMOS FET 808 may be electrically connected to the gate of NMOS anti-fuse FET 802. The source of NMOS anti-fuse FET 802 may be electrically connected to VSS. The gate of NMOS anti-fuse FET 802 may also be electrically connected to the drain of NMOS FET 804, and the source of NMOS FET 804 may be electrically connected to the BLR wire.

FIG. 8B illustrates the voltages which may be used for reading the contents of bitcell 800, programming bitcell 800, and inhibiting the programming of bitcell 800 (e.g., when a bitcell other than bitcell 800 is selected for programming). The columns in FIG. 8B may be interpreted similarly to the columns shown in FIG. 2C. Specifically, column 852 specifies the signal wires, column 854 specifies the voltages which may be applied to the signal wires of a selected bitcell to read the contents of the selected bitcell, column 856 specifies the voltages which may be applied to the signal wires of a selected bitcell to program the selected bitcell, and column 858 specifies the voltages which may be applied to the signal wires of an unselected bitcell to inhibit programming of the unselected bitcell. In FIG. 8B, the voltage "X" refers to a "don't care" voltage, i.e., the voltage may be equal to 0 V or VDD or anything in between.

Bitcell 800 may be operated in a similar way to bitcell 400. For example, the voltages in column 856 may be used to program bitcell 800 by (1) heating the dielectric of NMOS anti-fuse FET 802 by passing a large current through the channel of NMOS anti-fuse FET 802, and (2) concurrently applying a gate-to-channel voltage to NMOS anti-fuse FET 802, where the gate-to-channel voltage is greater than or equal to a rupture voltage.

Figure 9:
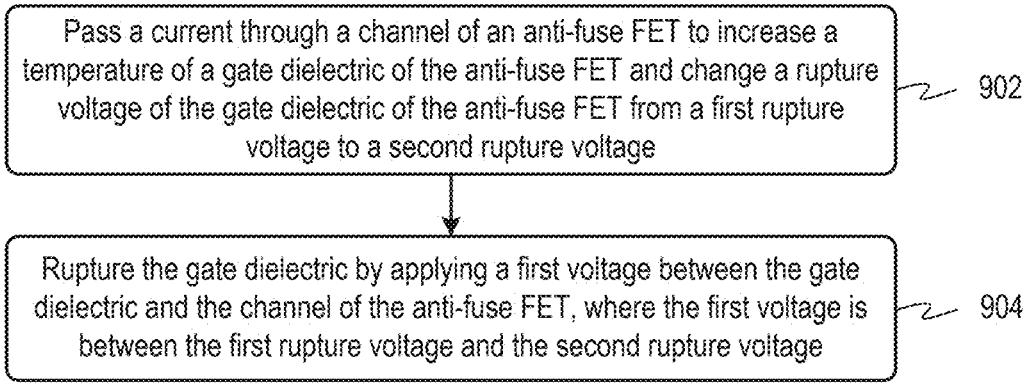
FIG. 9 illustrates a process for programming an anti-fuse FET in accordance with some embodiments described herein.

FIG. 9 illustrates a process for programming an anti-fuse FET in accordance with some embodiments described herein.

A current may be passed through a channel of an anti-fuse FET to increase a temperature of a gate dielectric of the anti-fuse FET and change a rupture voltage of the gate dielectric of the anti-fuse FET from a first rupture voltage to a second rupture voltage (at 902).

The gate dielectric may be ruptured by applying a first voltage between the gate dielectric and the channel of the anti-fuse FET, where the first voltage is between the first rupture voltage and the second rupture voltage (at 904). For example, the first rupture voltage may be 10 V, the second rupture voltage may be 5 V, and the first voltage may be 7 V. The gate dielectric may be ruptured by concurrently or simultaneously applying a high current through the channel and a high voltage across the gate of a portion of the gate of the device. For a PMOS anti-fuse, the gate rupture voltage is lower than the source voltage of the anti-fuse device. For an NMOS anti-fuse, the gate rupture voltage is the same or higher than the source voltage or the anti-fuse. In some embodiments, the channel current may be applied first and the gate stress may be applied next. In some embodiments described herein, a set of anti-fuse FETs which are desired to be ruptured may be selectively heated by passing currents through the channels of the set of anti-fuse FETs. Specifically, in some embodiments described herein, the same voltages may be applied to anti-fuse FETs which are desired to be ruptured and anti-fuse FETs which are not desired to be ruptured, and the anti-fuse FETs which have been selectively heated may rupture.

In some embodiments described herein, applying the first voltage between the gate dielectric and the channel of the anti-fuse FET may be performed after passing the current through the channel of an anti-fuse FET. For example, anti-fuse FET 104 in FIGS. 2A-2B may be programmed by using a two-step process as explained in reference to FIGS. 2A-2C.

In some embodiments described herein, applying the first voltage between the gate dielectric and the channel of the anti-fuse FET may be performed concurrently with passing the current through the channel of the anti-fuse FET. For example, the anti-fuse FETs in bitcell 400 in FIG. 4A, bitcell 500 in FIG. 5A, bitcell 600 in FIG. 6A, bitcell 700 in FIG. 7A, and bitcell 800 in FIG. 8A may be programmed using a single step process as explained in reference to FIGS. 4A-8B.

In some embodiments described herein, the anti-fuse FET may be a PMOS FET. For example, the anti-fuse FETs in bitcell 400 in FIG. 4A, bitcell 500 in FIG. 5A, and bitcell 600 in FIG. 6A are PMOS FETs.

In some embodiments described herein, the anti-fuse FET may be an NMOS FET. For example, the anti-fuse FETs in bitcell 700 in FIG. 7A and bitcell 800 in FIG. 8A are NMOS FETs.

In some embodiments described herein, the anti-fuse FET may be a fin FET as shown in FIG. 1D. In some embodiments described herein, the anti-fuse FET may be a gate-all-around (GAA) FET as shown in FIGS. 1E-1F.

In some embodiments described herein and as shown in FIGS. 2A, 4A, 5A, 6A, 7A, and 8A, the anti-fuse FET may be part of a bitcell, and the bitcell may include a circuit to (1) pass a current through a channel of the anti-fuse FET to increase a temperature of a gate dielectric of the anti-fuse FET and change a rupture voltage of the gate dielectric of the anti-fuse FET from a first rupture voltage to a second rupture voltage, and (2) rupture the gate dielectric by applying a first voltage between the gate dielectric and the channel of the anti-fuse FET, where the first voltage is between the first rupture voltage and the second rupture voltage.

In some embodiments described herein, the circuit may include a first FET (e.g., FET 102 in FIG. 2A) and a second FET (e.g., FET 106 in FIG. 2A). A source of the first FET may be electrically connected to the drain of the anti-fuse FET (e.g., FET 104 in FIG. 2A), and a source of the anti-fuse FET may be electrically connected to the drain of the second FET.

In some embodiments described herein, the anti-fuse FET may be a PMOS FET (e.g., PMOS anti-fuse FET 402 in FIG. 4A), and the circuit may include a first NMOS FET (e.g., NMOS FET 404 in FIG. 4A) and a second NMOS FET (e.g., NMOS FET 406 in FIG. 4A). A gate of the anti-fuse FET may be electrically connected to a drain of the first NMOS FET, and a source of the anti-fuse FET may be electrically connected to a drain of the second NMOS FET.

In some embodiments described herein, the anti-fuse FET may be a PMOS FET (e.g., PMOS anti-fuse FET 502 in FIG. 5A), and the circuit may include a first PMOS FET (e.g., PMOS FET 508 in FIG. 5A), a first NMOS FET (e.g., NMOS FET 504 in FIG. 5A), and a second NMOS FET (e.g., NMOS FET 506 in FIG. 5A). A gate of the anti-fuse FET and a gate of the first PMOS FET may be electrically connected to a drain of the first NMOS FET, a source of the anti-fuse FET may be electrically connected to a drain of the first PMOS FET, and a source of the first PMOS FET may be electrically connected to a drain of the second NMOS FET.

In some embodiments described herein, the anti-fuse FET may be a PMOS FET (e.g., PMOS anti-fuse FET 602 in FIG. 6A), and the circuit may include a first NMOS FET (e.g., NMOS FET 604 in FIG. 6A), a second NMOS FET (e.g., NMOS FET 606 in FIG. 6A), and a third NMOS FET (e.g., NMOS FET 608 in FIG. 6A). A gate of the anti-fuse FET may be electrically connected to a drain of the first NMOS FET, a source of the anti-fuse FET may be electrically connected to a drain of the second NMOS FET, and a source of the second NMOS FET may be electrically connected to a drain of the third NMOS FET.

In some embodiments described herein, the anti-fuse FET may be an NMOS FET (e.g., NMOS anti-fuse FET 702 in FIG. 7A), and the circuit may include a first NMOS FET (e.g., NMOS FET 706 in FIG. 7A). A gate of the anti-fuse FET may be electrically connected to a drain of the anti-fuse FET, and a source of the anti-fuse FET may be electrically connected to a drain of the first NMOS FET.

In some embodiments described herein, the anti-fuse FET may be an NMOS FET (e.g., NMOS anti-fuse FET 802 in FIG. 8A), and the circuit may include a first PMOS FET (e.g., PMOS FET 806 in FIG. 8A) and a second PMOS FET (e.g., PMOS FET 808 in FIG. 8A). A drain of the anti-fuse FET may be electrically connected to a source of the first PMOS FET, a gate of the anti-fuse FET may be electrically connected to a source of the second PMOS FET, a drain of the first PMOS FET may be electrically connected to a drain of the second PMOS FET, and a gate of the first PMOS FET may be electrically connected to a gate of the second PMOS FET.

In some embodiments described herein, the stress (which causes the rupture) is from gate to source or gate to drain instead of gate to channel. In some embodiments described herein, the bitcell has high current metal lines running in parallel. Some processes have backside interconnect where one metal stack is optimized for power (low resistance) and another metal stack is optimized for signal transmission (low capacitance). When backside metal is available, having a high current signal running in parallel to take advantage of the optimized high current metal may be desirable, as shown in FIGS. 4A-4B, 5A-5B, 6A-6B, 7A-7B, and 8A-8B. In processes that do not have two metal stacks, the high current lines may be run perpendicular.

In some embodiments, device sizes may be optimized to maximize the current flow through the anti-fuse FET, which may maximize the amount of heat generated in the anti-fuse FET and may ensure that other devices do not get too hot.

In some embodiments, additional devices may be added to the bitcell to reduce stress on the select devices. The select devices include devices in the bitcell used to connect to the anti-fuse. These additional devices can be used to cascode or cascade devices.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   passing a current through a channel of an anti-fuse field-effect transistor (FET) to increase a temperature of a gate dielectric of the anti-fuse FET and change a rupture voltage of the gate dielectric of the anti-fuse FET from a first rupture voltage to a second rupture voltage; and
   rupturing the gate dielectric by applying a first voltage between the gate dielectric and the channel of the anti-fuse FET, wherein the first voltage is between the first rupture voltage and the second rupture voltage.

2. The method of claim 1, wherein the applying the first voltage between the gate dielectric and the channel of the anti-fuse FET is performed concurrently with the passing the current through the channel of the anti-fuse FET.

3. The method of claim 1, wherein the applying the first voltage between the gate dielectric and the channel of the anti-fuse FET is performed after the passing the current through the channel of an anti-fuse FET.

4. The method of claim 1, wherein the anti-fuse FET is a p-channel metal-oxide semiconductor FET.

5. The method of claim 1, wherein the anti-fuse FET is an n-channel metal-oxide semiconductor FET.

6. The method of claim 1, wherein the anti-fuse FET is a gate-all-around FET.

7. The method of claim 1, wherein a set of anti-fuse FETs which are desired to be ruptured are selectively heated by passing currents through channels of the set of anti-fuse FETs.

8. A bitcell, comprising:
   an anti-fuse field-effect transistor (FET); and
   a circuit to:
      pass a current through a channel of the anti-fuse FET to increase a temperature of a gate dielectric of the anti-fuse FET and change a rupture voltage of the gate dielectric of the anti-fuse FET from a first rupture voltage to a second rupture voltage; and
      rupture the gate dielectric by applying a first voltage between the gate dielectric and the channel of the anti-fuse FET, wherein the first voltage is between the first rupture voltage and the second rupture voltage.

9. The bitcell of claim 8, wherein the circuit comprises a first FET and a second FET, wherein a source of the first FET is electrically connected to the drain of the anti-fuse FET, and wherein a source of the anti-fuse FET is electrically connected to the drain of the second FET.

10. The bitcell of claim 8, wherein the anti-fuse FET is a p-channel metal-oxide semiconductor (PMOS) FET, wherein the circuit comprises a first n-channel metal-oxide semiconductor (NMOS) FET and a second NMOS FET, wherein a gate of the anti-fuse FET is electrically connected to a drain of the first NMOS FET, and wherein a source of the anti-fuse FET is electrically connected to a drain of the second NMOS FET.

11. The bitcell of claim 8, wherein the anti-fuse FET is a p-channel metal-oxide semiconductor (PMOS) FET, wherein the circuit comprises a first PMOS FET, a first n-channel metal-oxide semiconductor (NMOS) FET, and a second NMOS FET, wherein a gate of the anti-fuse FET and a gate of the first PMOS FET are electrically connected to a drain of the first NMOS FET, wherein a source of the anti-fuse FET is electrically connected to a drain of the first PMOS FET, and wherein a source of the first PMOS FET is electrically connected to a drain of the second NMOS FET.

12. The bitcell of claim 8, wherein the anti-fuse FET is a p-channel metal-oxide semiconductor (PMOS) FET, wherein the circuit comprises a first n-channel metal-oxide semiconductor (NMOS) FET, a second NMOS FET, and a third NMOS FET, wherein a gate of the anti-fuse FET is electrically connected to a drain of the first NMOS FET, wherein a source of the anti-fuse FET is electrically connected to a drain of the second NMOS FET, and wherein a source of the second NMOS FET is electrically connected to a drain of the third NMOS FET.

13. The bitcell of claim 8, wherein the anti-fuse FET is an n-channel metal-oxide semiconductor (NMOS) FET, wherein the circuit comprises a first NMOS FET, wherein a gate of the anti-fuse FET is electrically connected to a drain of the anti-fuse FET, and wherein a source of the anti-fuse FET is electrically connected to a drain of the first NMOS FET.

14. The bitcell of claim 8, wherein the anti-fuse FET is an n-channel metal-oxide semiconductor (NMOS) FET, wherein the circuit comprises a first p-channel metal-oxide semiconductor (PMOS) FET and a second PMOS FET, wherein a drain of the anti-fuse FET is electrically connected to a source of the first PMOS FET, wherein a gate of the anti-fuse FET is electrically connected to a source of the second PMOS FET, wherein a drain of the first PMOS FET is electrically connected to a drain of the second PMOS FET, and wherein a gate of the first PMOS FET is electrically connected to a gate of the second PMOS FET.

15. A non-volatile memory, comprising:
an anti-fuse field-effect transistor (FET); and
a circuit to:
pass a current through a channel of the anti-fuse FET, which increases a temperature of a gate dielectric of the anti-fuse FET and changes a rupture voltage of the gate dielectric of the anti-fuse FET from a first rupture voltage to a second rupture voltage;
rupture the gate dielectric by applying a first voltage between the gate dielectric and the channel of the anti-fuse FET, wherein the first voltage is between the first rupture voltage and the second rupture voltage; and
wherein the applying the first voltage between the gate dielectric and the channel of the anti-fuse FET is performed concurrently with the passing the current through the channel of the anti-fuse FET.

16. The non-volatile memory of claim 15, wherein the anti-fuse FET is a p-channel metal-oxide semiconductor (PMOS) FET, wherein the circuit comprises a first n-channel metal-oxide semiconductor (NMOS) FET and a second NMOS FET, wherein a gate of the anti-fuse FET is electrically connected to a drain of the first NMOS FET, and wherein a source of the anti-fuse FET is electrically connected to a drain of the second NMOS FET.

17. The non-volatile memory of claim 15, wherein the anti-fuse FET is a p-channel metal-oxide semiconductor (PMOS) FET, wherein the circuit comprises a first PMOS FET, a first n-channel metal-oxide semiconductor (NMOS) FET, and a second NMOS FET, wherein a gate of the anti-fuse FET and a gate of the first PMOS FET are electrically connected to a drain of the first NMOS FET, wherein a source of the anti-fuse FET is electrically connected to a drain of the first PMOS FET, and wherein a source of the first PMOS FET is electrically connected to a drain of the second NMOS FET.

18. The non-volatile memory of claim 15, wherein the anti-fuse FET is a p-channel metal-oxide semiconductor (PMOS) FET, wherein the circuit comprises a first n-channel metal-oxide semiconductor (NMOS) FET, a second NMOS FET, and a third NMOS FET, wherein a gate of the anti-fuse FET is electrically connected to a drain of the first NMOS FET, wherein a source of the anti-fuse FET is electrically connected to a drain of the second NMOS FET, and wherein a source of the second NMOS FET is electrically connected to a drain of the third NMOS FET.

19. The non-volatile memory of claim 15, wherein the anti-fuse FET is an n-channel metal-oxide semiconductor (NMOS) FET, wherein the circuit comprises a first NMOS FET, wherein a gate of the anti-fuse FET is electrically connected to a drain of the anti-fuse FET, and wherein a source of the anti-fuse FET is electrically connected to a drain of the first NMOS FET.

20. The non-volatile memory of claim 15, wherein the anti-fuse FET is an n-channel metal-oxide semiconductor (NMOS) FET, wherein the circuit comprises a first p-channel metal-oxide semiconductor (PMOS) FET and a second PMOS FET, wherein a drain of the anti-fuse FET is electrically connected to a source of the first PMOS FET, wherein a gate of the anti-fuse FET is electrically connected to a source of the second PMOS FET, wherein a drain of the first PMOS FET is electrically connected to a drain of the second PMOS FET, and wherein a gate of the first PMOS FET is electrically connected to a gate of the second PMOS FET.

* * * * *